J. J. BINDER.
COMBINED MOTOR CAR AND HEARSE.
APPLICATION FILED FEB. 29, 1916.
1,201,798.
Patented Oct. 17, 1916.
2 SHEETS—SHEET 1.
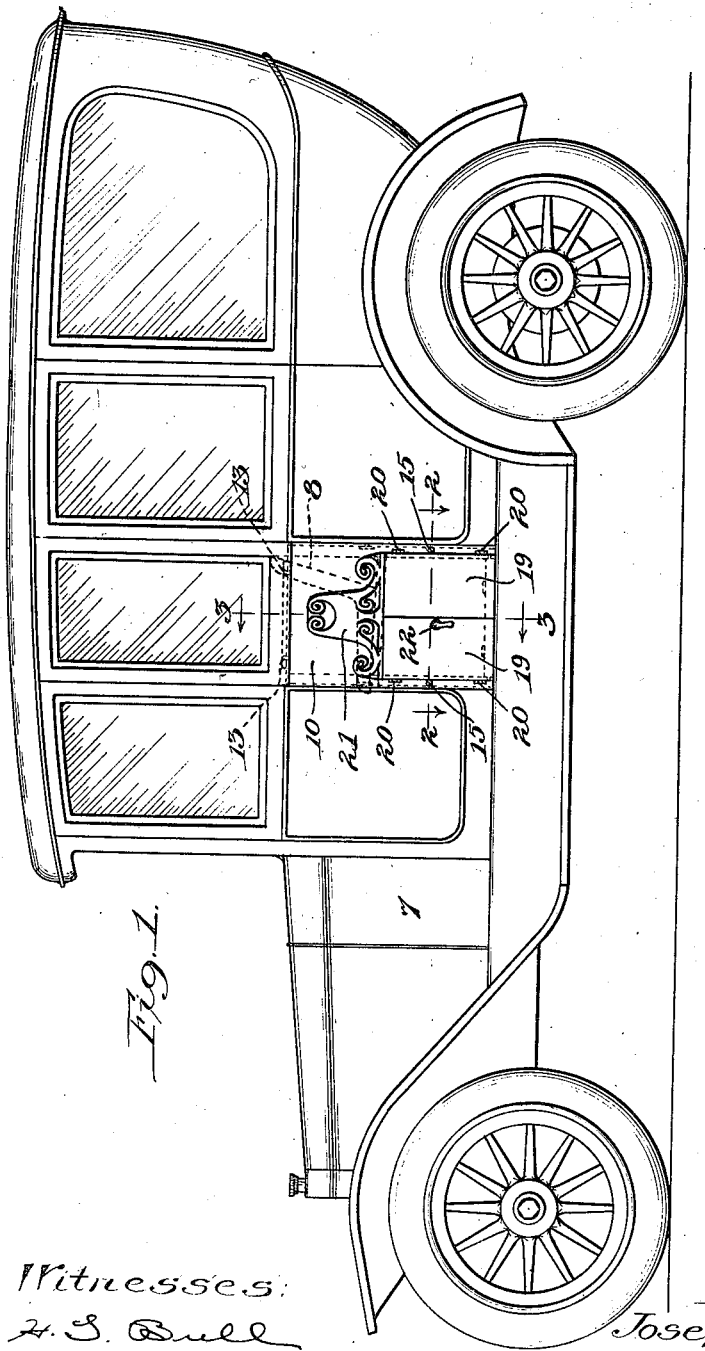
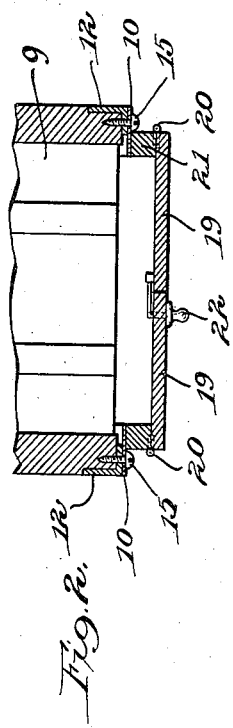
Witnesses:
H. S. Bull
A. A. Olson
Inventor,
Joseph J. Binder;
by Joshua R. H. Potts
his Attorney.

J. J. BINDER.
COMBINED MOTOR CAR AND HEARSE.
APPLICATION FILED FEB. 29, 1916.
1,201,798.
Patented Oct. 17, 1916.
2 SHEETS—SHEET 2.
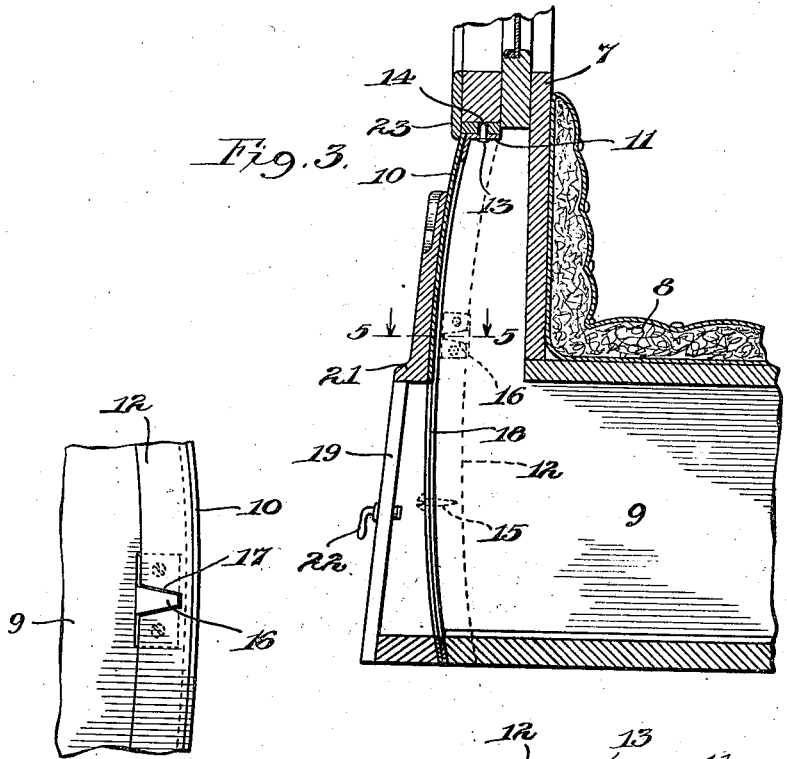
Fig. 3.
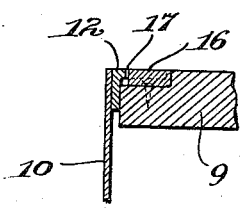
Fig. 4.
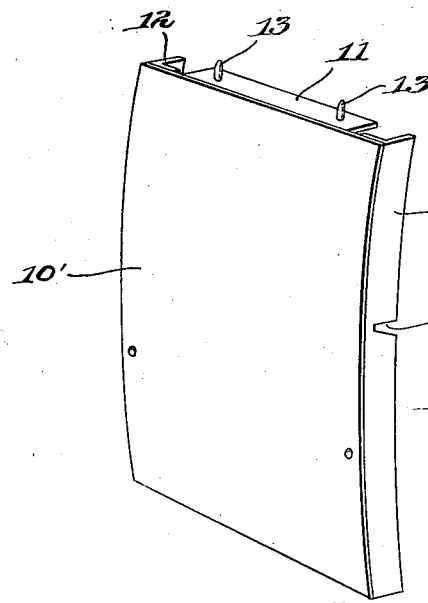
Fig. 5.
Fig. 6.
Witnesses:
H. J. Bull
A. A. Olson
Inventor:
Joseph J. Binder,
by Joshua R. H. Potts
his Attorney.

UNITED STATES PATENT OFFICE.

JOSEPH J. BINDER, OF CHICAGO, ILLINOIS.

COMBINED MOTOR CAR AND HEARSE.

1,201,798.

Specification of Letters Patent.   Patented Oct. 17, 1916.

Application filed February 29, 1916.   Serial No. 81,104.

*To all whom it may concern:*

Be it known that I, JOSEPH J. BINDER, a citizen of the United States, and a resident of the city of Chicago, county of Cook, and State of Illinois, have invented certain new and useful Improvements in Combined Motor Cars and Hearses, of which the following is a specification.

My invention relates to improvements in automobiles of the class so designed as to permit of the same being converted into a funeral car or hearse.

The object of my invention is the production of a vehicle of the character mentioned which will be so constructed that when the same is not used as a hearse or funeral car, the same will present the appearance of an ordinary limousine automobile.

A further object is the production of a vehicle as mentioned in which the improvements employed will be of simple construction and efficient in use.

Other objects will appear hereinafter.

With these objects in view, the invention consists in the combinations and arrangements of parts hereinafter described and claimed.

The invention will be best understood by reference to the accompanying drawings forming a part of this specification, and in which, Figure 1 is a side elevation of a motor car embodying the invention, Fig. 2 is an enlarged section taken on line 2—2 of Fig. 1, Fig. 3 is an enlarged section taken on line 3—3 of Fig. 1, Fig. 4 is an enlarged detail side elevation of the central portion of the closure of the compartment formed in the vehicle, illustrating the means of preventing relative shifting of the closure. Fig. 5 is an enlarged section taken on substantially line 5—5 of Fig. 3, and Fig. 6 is a perspective view of the closure member adapted to be used when the vehicle is employed as an ordinary pleasure vehicle or not as a funeral car.

The improvements forming the subject matter of the present invention are used in connection with an automobile or motor car of the conventional limousine type. In the body of said vehicle is provided the usual driver's seat 8, and under said seat is formed a laterally opening compartment 9 adapted to receive a coffin or casket, as will be readily understood.

The closure 10 for the compartment 9 is in the form of a rectangular panel, at the upper end and vertical edges of which are provided rearwardly projecting angle irons or flanges 11 and 12 respectively. Projecting upwardly from the flange 11 are two spaced tapering pins 13 adapted for engagement with recesses or sockets 14 which are formed in the body 7 at the upper side of the mouth of compartment 9. Said pins thus serve to hold the upper end of the closure in position against horizontal movement. The lower end of said closure is fastened in position by means of screws 15 which pass through the lateral edges of the closure, entering the corresponding walls of compartment 9, as clearly shown in Fig. 2. In order to positively lock the closure against vertical movement or shifting so as to positively prevent release of the pins 13, tapering tongues 16 are provided at the outer sides of the lateral walls of compartment 9, at the mouth of the latter, for engagement with slots 17 of corresponding form provided in the flanges 12, as clearly shown in Figs. 4 and 5. By reason of the tapering form of said tongues and slots, the tongues more readily engage with said slots, while at the same time the closure will be forced to its proper position upon pressing of the closure toward the body of the vehicle.

The closure 10 is formed at its lower end with an opening 18 which is normally closed by doors 19 which are hinged at 20 to a sort of molding 21 secured rigidly upon the front side of said closure. Said doors are held in closed position by a suitable locking device 22, and the upper end of the molding member 21 is formed into any ornate design, as shown, for decorative purposes.

The closure 10 is used where the vehicle is employed as a funeral car or hearse. When the vehicle is not thus employed, the closure 10 is removed and a closure 10′, which is in the form of a plain smooth panel, is inserted in its place. The closure 10′ is secured in position in precisely the same manner as the closure 10, and when substituted for the closure 10 serves to entirely close the compartment 9 so as to hide any suggestion of the fact that the vehicle has within the same a coffin or casket compartment so as to permit of the vehicle being used as a hearse. The closure extends from just below the windows of the body of the vehicle so that the joint at the upper end of the closure is covered by the depending flange 23 of the top of the vehicle body, as clearly shown in Fig. 3.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. An automobile body having a seat therein; an outwardly opening compartment in said body arranged below said seat; a removable closure for said compartment; means for securing said closure in operative position, said means comprising projections on said closure adapted for releasable engagement with recesses in said body; means for locking said closure against shifting in a direction to release said projections; and a tongue and slot connection between said closure and said body for locking said closure against shifting in a direction to release said projections, substantially as described.

2. An automobile body having a seat therein; an outwardly opening compartment in said body arranged below said seat; a removable closure for said compartment; means for securing said closure in operative position, said means comprising projections on said closure adapted for releasable engagement with recesses in said body; means for locking said closure against shifting in a direction to release said projections; and a tapering tongue adapted for engagement with a tapering slot for locking said closure against shifting in a direction to release said projection, substantially as described.

3. An automobile body having a seat therein; an outwardly opening compartment in said body arranged below said seat; a removable closure for said compartment; means for securing said closure in operative position, said means comprising projections on one end of said closure adapted for releasable engagement with recesses in said body; securing devices for fastening the other end of said closure to said body; and projections on said body adapted for engagement with slots on said closure for holding the latter against relative shifting, substantially as described.

4. An automobile body having a seat therein; an outwardly opening compartment in said body arranged below said seat; a removable closure for said compartment; means for securing said closure in operative position, said means comprising projections on one end of said closure adapted for releasable engagement with recesses in said body; securing devices for fastening the other end of said closure to said body; rearwardly projecting flanges on said closure having slots; and projections on said body for engagement with said slots for holding said closure against relative shifting, substantially as described.

5. An automobile body having a seat therein; an outwardly opening compartment in said body arranged below said seat; a removable closure for said compartment; means for securing said closure in operative position, said means comprising projections on one end of said closure adapted for releasable engagement with recesses in said body; securing devices for fastening the other end of said closure to said body; rearwardly projecting flanges on said body having inwardly tapering slots; and correspondingly tapering projections on said body for engagement with said slots for holding said closure against relative shifting, substantially as described.

6. A vehicle body having an outwardly opening compartment; and a pair of interchangeable closures either of which is adapted for removable mounting on said body to close said compartment, one of said closures having means through which access may be gained to the interior of the compartment when said closure is in operative position, substantially as described.

7. A vehicle body having an outwardly opening compartment; a pair of interchangeable closures either of which is adapted for removable mounting on said body to close said compartment, one of said closures having an opening through which access may be gained to the interior of the compartment when said closure is in said operative position; and doors mounted on said closure for closing said opening, substantially as described.

In testimony whereof I have signed my name to this specification in the presence of two subscribing witnesses.

JOSEPH J. BINDER.

Witnesses:
JOSHUA R. H. POTTS,
HELEN F. LILLIS.